United States Patent [19]

Bush

[11] Patent Number: 4,789,863
[45] Date of Patent: Dec. 6, 1988

[54] PAY PER VIEW ENTERTAINMENT SYSTEM

[76] Inventor: Thomas A. Bush, 310 E. 8th St., New York, N.Y. 10028

[21] Appl. No.: 145,645

[22] Filed: Jan. 13, 1988

Related U.S. Application Data

[63] Continuation of Ser. No. 783,094, Oct. 2, 1985, abandoned.

[51] Int. Cl.[4] .................. H04N 7/167; H04Q 9/00
[52] U.S. Cl. ................. 340/825.350; 380/10; 358/86; 340/825.030; 340/825.250
[58] Field of Search .............. 340/825.35, 825.03, 340/825.25; 358/85, 86; 455/2, 4; 380/10, 20; 379/101

[56] References Cited

U.S. PATENT DOCUMENTS

| Re. 31,639 | 7/1984 | Nicholson | 358/86 |
|---|---|---|---|
| 3,718,906 | 2/1973 | Lightner | 340/825.35 |
| 4,163,254 | 7/1979 | Block et al. | 380/20 |
| 4,272,791 | 6/1982 | Rifkin | 358/86 |
| 4,300,040 | 11/1981 | Gould et al. | 340/825.35 |
| 4,359,631 | 11/1982 | Lockwood | 235/381 |
| 4,433,207 | 2/1984 | Best | 178/22.09 |
| 4,471,379 | 9/1984 | Stephens | 358/120 |
| 4,506,387 | 3/1985 | Walter | 358/86 |
| 4,513,315 | 4/1985 | Dekker | 358/86 |
| 4,538,176 | 8/1985 | Narajima et al. | 358/86 |
| 4,567,512 | 1/1986 | Abraham | 358/86 |
| 4,590,516 | 5/1986 | Abraham | 358/86 |
| 4,685,131 | 8/1987 | Horne | 358/86 |
| 4,700,386 | 10/1987 | Kohn | 358/86 |

OTHER PUBLICATIONS

Microcomputer Dictionary, 2nd Edition 1981, by Charles J. Sippl (pp. 10, 322, 328,329).

Primary Examiner—Donald J. Yusko
Attorney, Agent, or Firm—Morgan & Finnegan

[57] ABSTRACT

In a pay per view entertainment system, prerecorded entertainment such as musical works are distributed to subscribers over a cable network. The subscribers are able to listen to edited versions or previews of the complete musical works and to select desired musical works for recording. Before the musical work is recorded on a special receiver, the subscriber is billed for the service.

18 Claims, 8 Drawing Sheets

PAY PER VIEW ENTERTAINMENT SYSTEM

This is a continuation of co-pending application Ser. No. 783,094, filed on Oct. 2, 1985 and now abandoned.

BACKGROUND OF THE INVENTION

1. Field of the Invention

The present invention relates to a pay per view entertainment system, and more specifically, to a pay per view cable system in which subscribers are able to select, record, and pay for audio entertainment in their homes.

2. Description of the Prior Art

The recording industry produces an enormous amount of recorded material for distribution to the public. The rather archaic distribution and promotion system of the recording industry enables the consuming public to hear only a small portion of recorded material prior to purchase. The industry's distribution system enables only a relatively small number of recorded works to be packaed in cellophane and sent to retail outlets for purchase by the consumer. Unless the consumer is familiar with artists or has heard the recording on the radio or television, the consumer has no knowledge of what is in the cellophane wrapped package and has no opportunity to listen to the recording. Consequently, large amounts of commercial quality music go unpurchased.

The advent of cable television has made it possible for prerecorded films and other television programs to be distributed to the public on a pay per view basis. These pay per view systems enable a rather large audience of viewers to tune in to the selected programs at a predetermined time. Such a pay per view system does not presently exist for prerecorded music, because there is no way to economically distribute the rather wide variety of prerecorded music to the large number of consumers that might be interested in paying for such entertainment on a pay per view basis.

Accordingly, there is a need for a pay per view system to distribute prerecorded music to the consuming public.

SUMMARY OF THE INVENTION

The present invention relates to a system for distributing prerecorded entertainment to the consuming public. The system includes a source of prerecorded entertainment that is in the form of complete musical works and highlighted selections or previews of these complete musical works. The source uses compact disc mastering equipment or cart duplication equipment to make the prerecorded musical entertainment available to an operator. The operator possesses playback equipment that is connected to a network of coaxial cable. The coaxial cable connects the operator to each individual subscriber. Each individual subscriber possesses a receiver which is capable of receiving the previews of the complete musical works. If the subscriber is desirous of making a recording of the complete musical work, he enters data into a keyboard and the receiver records the desired selection. The service charge associated with the recording of the selected musical work is automatically charged to the subscriber.

DETAILED DESCRIPTION OF INVENTION

Figure 1:
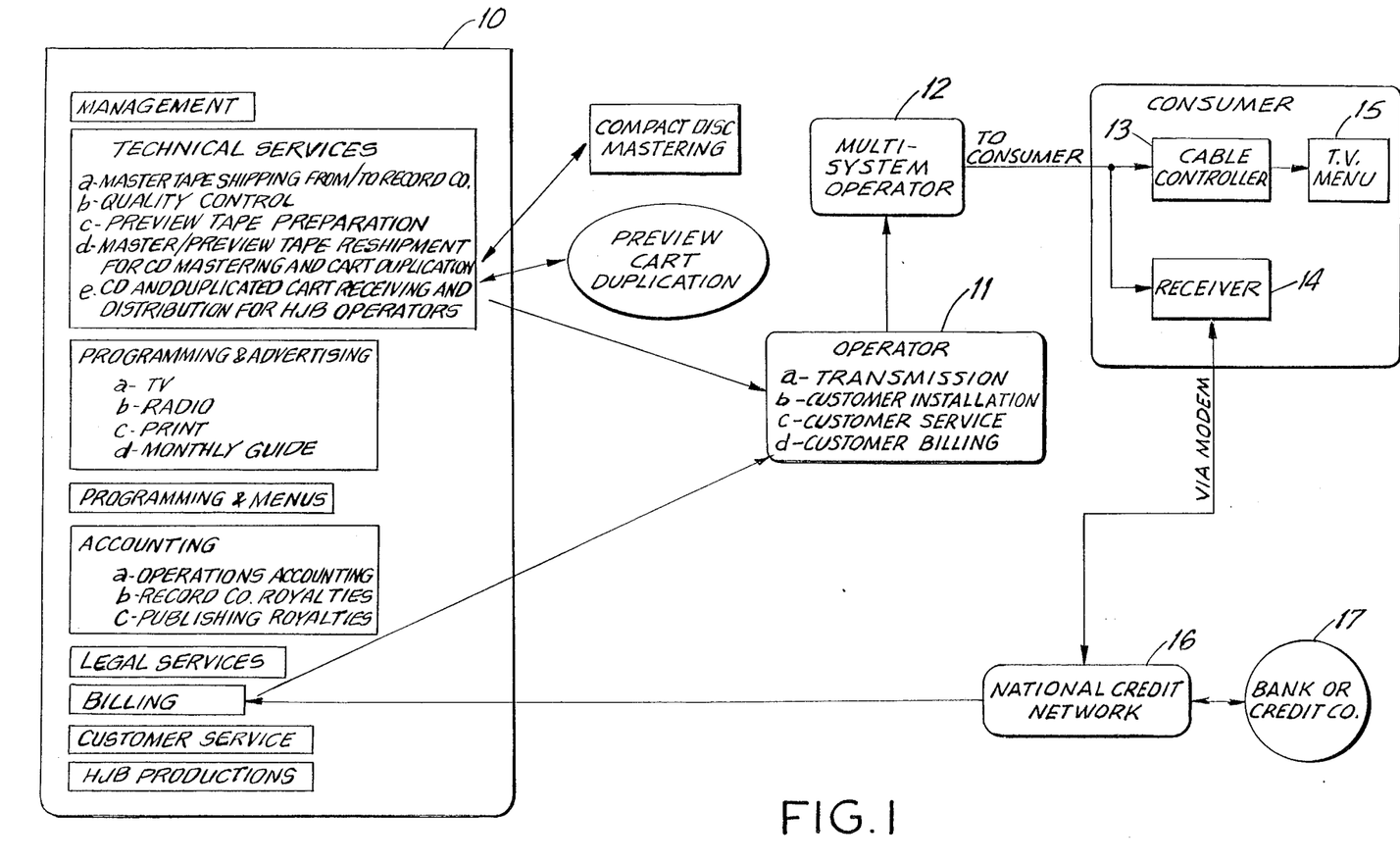
FIG. 1 is a block diagram of the pay per view entertainment system of the present invention.

Referring now to FIG. 1, a block diagram illustrates the pay per view entertainment system of the present invention. The system is controlled by a source 10. The source 10 is a corporation or qroup of people who obtain prerecorded entertainment which in the preferred embodiment of the present invention is prerecorded musical works. It should be understood, however, that the entertainment is not solely limited to musical works but could include video recordings or computer software. The source 10 obtains the prerecorded entertainment and distributes it to an operator 11.

The source 10 obtains the prerecorded entertainment from record companies in the form of equalized master recordings, which can be in analog or digital formats. From these master recordings, compact disc (CD) masters and carts are prepared. Preview carts are prepared, which include highlighted segments from the master recordings. The source is responsible for obtaining the master recordings, quality control of their duplication, and distribution of the duplicated master recordings. The complete works and previews are distributed to the system operator 11 or multi-system operator 12. The multi-system operators 12 are simply sub-operators who operate in geographical locations different from that of the operator 11.

The source 10 is also responsible for the advertising of the system, the programming of the prerecorded entertainment, legal services, customer service, and customer billing.

The operator 11 and multi-systems operators 12 distribute the prerecorded entertainment on a coaxial cable network connected to subscribers. The cable network is preferably the same cable network presently used to distribute television programs. The prerecorded entertainment is applied to a cable controller 13 at the location of the subscriber and to a specially designed receiver 14, hereinafter described in greater detail. The cable controller 13 is also connected to the subscriber's television 15 to provide the subscriber with video information regarding the prerecorded entertainment. The receiver 14 is also connected by a modem and telephone lines to a financial service organization, such as a national credit network 16 and a bank 17. The financial service organizations enable the source 10 to paid be a service fee for the subscriber's use of the system.

Figure 2:
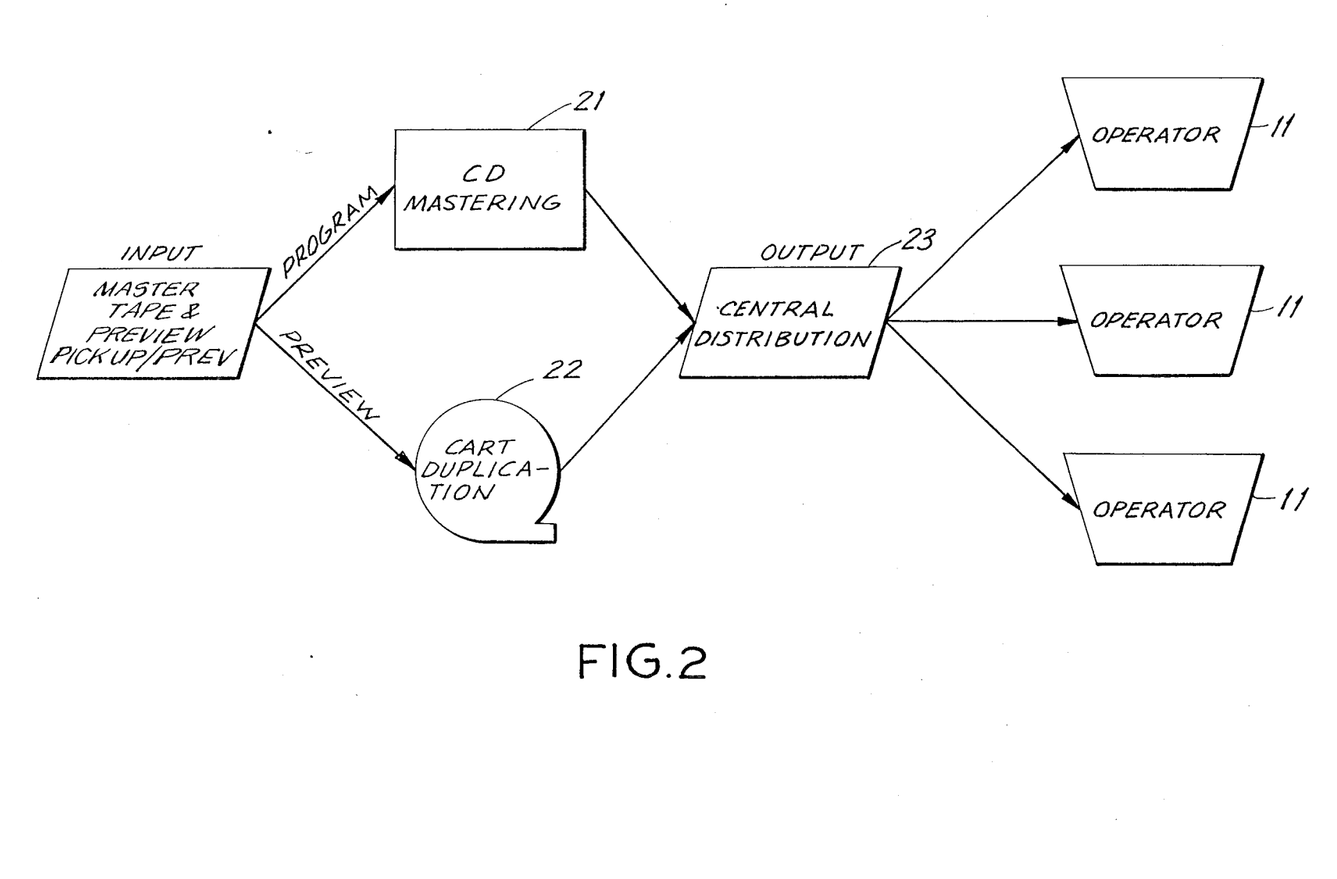
FIG. 2 is a flow diagram of the distribution of prerecorded entertainment between the system source and system operators.

Referring now to FIG. 2, a flow diagram illustrates the flow of prerecorded entertainment from the source 10. The input 20 to the system is the master recordings from the record companies. The source 10 as explained above is responsible for &he CD mastering 2I of the complete work or program and the cart duplication 22 of the previews. These CD masters and cart duplications are the output 23 which are distributed by source 10. The source 10 in turn distributes the CD masters and preview carts to operator 11.

Figure 3:
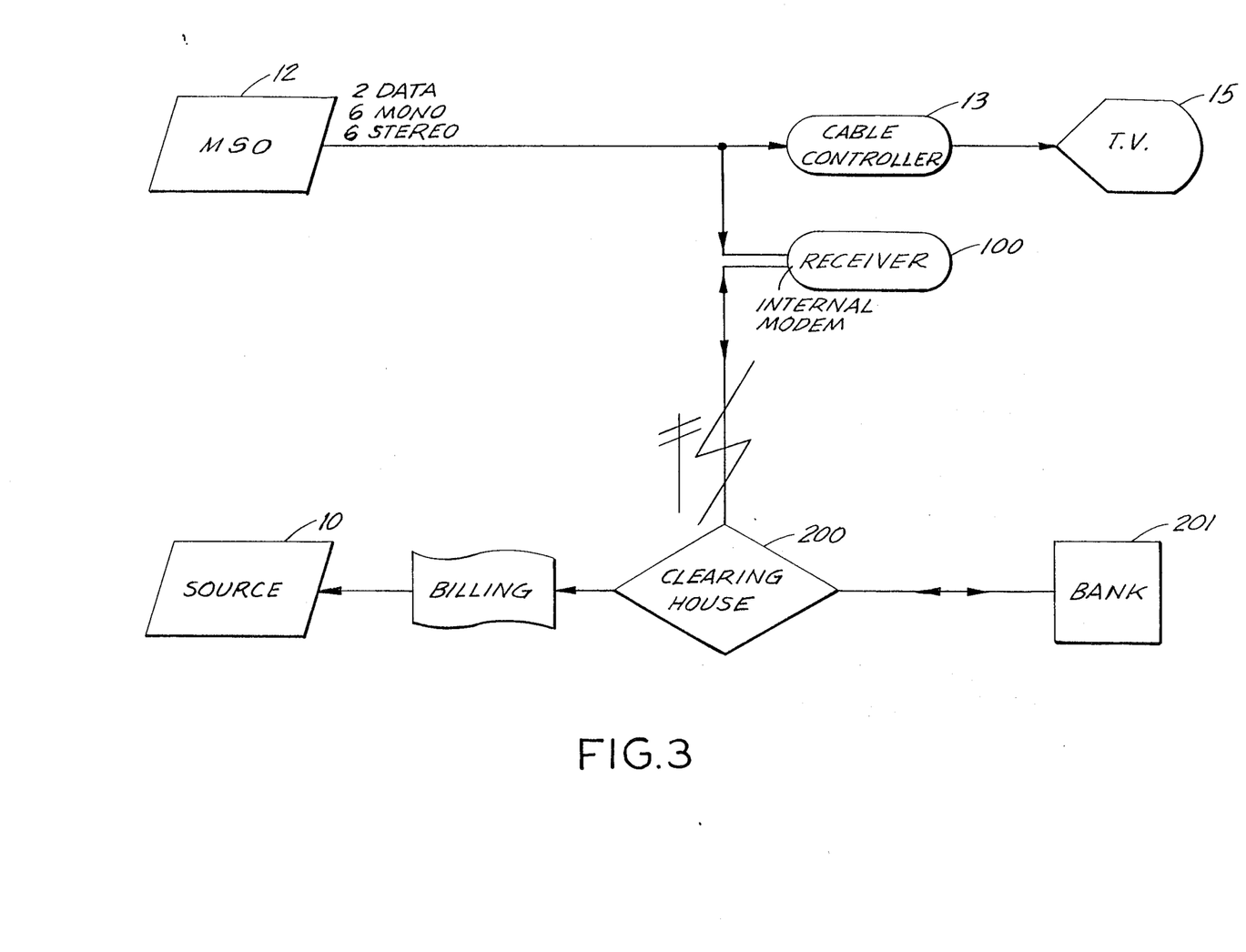
FIG. 3 is a flow diagram of the distribution of prerecorded entertainment from the system operator to subscribers and the payment of subscribers for such services.

Referring now to FIG. 3, a block diagram illustrates the distribution of the recorded entertainment and the payment of subscribers for such services. Coaxial cable connects the MSO 12 to the cable controller 13 which is present at the location of each subscriber. The coaxial cable is capable of carrying two data channels, 6 mono channels, and six stereo channels. The cable controller 13 applies the video channels to the subscriber's television 15. A special receiver 100 which includes an internal modem receives the mono and stereo channels and two data channels. The receiver 100 is described hereinafter in greater detail. The internal modem is connected by telephone lines to a clearing house 200. The clearing house 200 is capable of checking the subscriber's credit or account at bank 201. The clearing house 200 performs a billing function by transferring funds to source 10.

Figure 4:
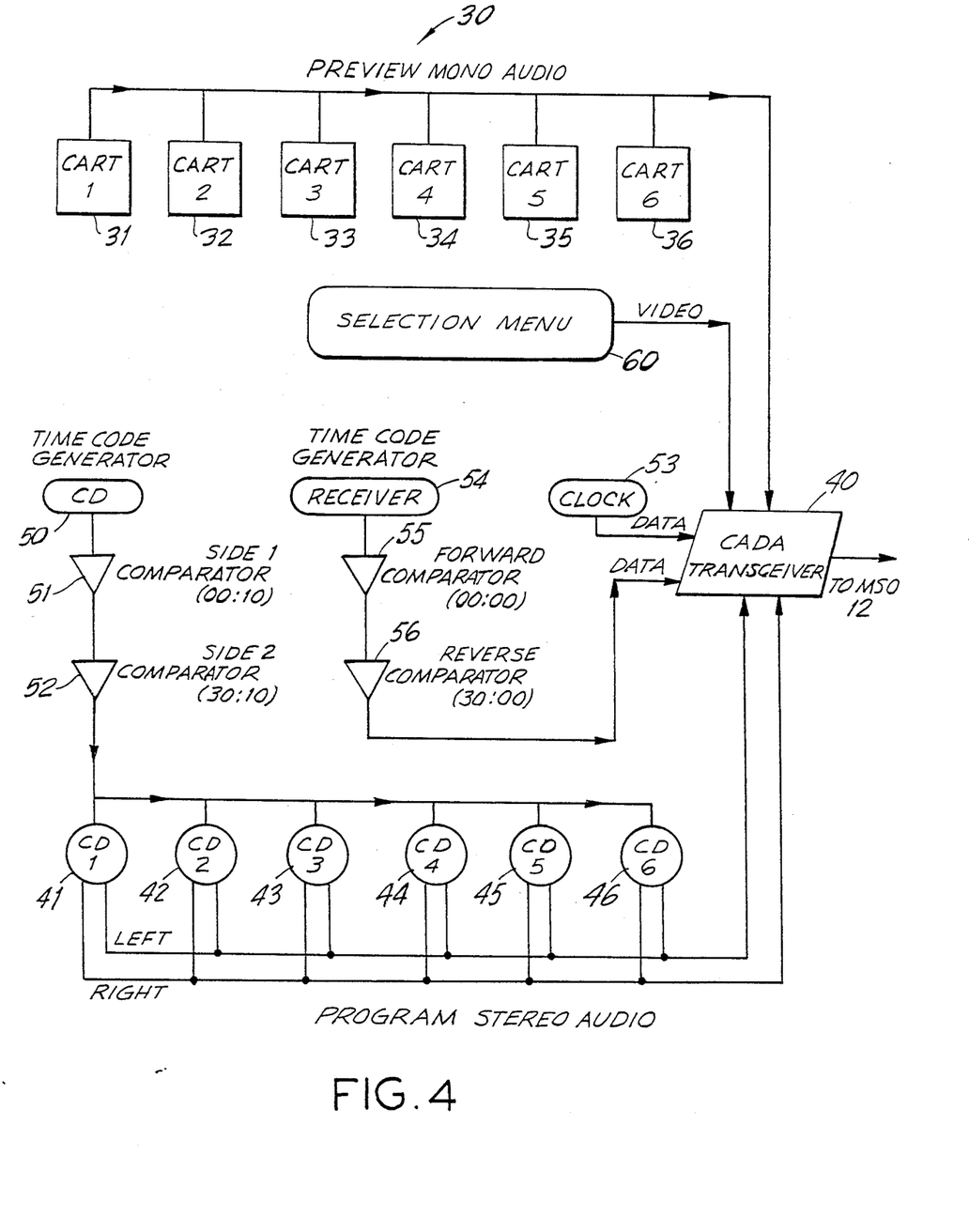
FIG. 4 is a block diagram of the equipment of the system operators for distributing the prerecorded entertainment.

Referring now to FIG. 4, a block diagram illustrates the eguipment 30 of the system operator 11 for distributing the prerecorded entertainment. The equipment 30 includes CADA transceiver 40. The transceiver 40 is preferably of a type manufactured by Sony Corporation which is capable of transmitting digital audio and data transmissions within existing cable systems. The system, transmits within a 6 MHz wide channel a total of 32 monaural or data channels, 8 eight bit stereo channels, 4 sixteen bit digital stereo channels, or 128 digital channels or any combination thereof. The equipment also includes a plurality of cart machines 31-36 which play the previews of the recorded entertainment. The output of the cart machines 31-36 is a mono audio output which is applied to the CADA (trademark of Sony Corporation) transceiver 40. The 40 also receives the input from compact disc machines 41-46, in the form of stereo audio signals. These stereo audio signals include the complete works of prerecorded entertainment which are distributed to the subscribers for recording. The compact disc machines 41-46 are responsive to a time code generator 50 and comparators 51-52 which control the playing of sides 1 and 2 every thirty minutes. The receiver 100 is responsive to a clock 53. The receiver 100 is also responsive to a time code generator 54 and comparators 55,56 which are capable of providing forwarding and reversing data to the CADA transceiver. The output of the CADA transceiver 40 is supplied to the MSO's 12. A video menu 60 is transmitted to TV 15.

Optionally, a second CADA transceiver may be employed for transmitting additional data, if necessary.

Figure 5:
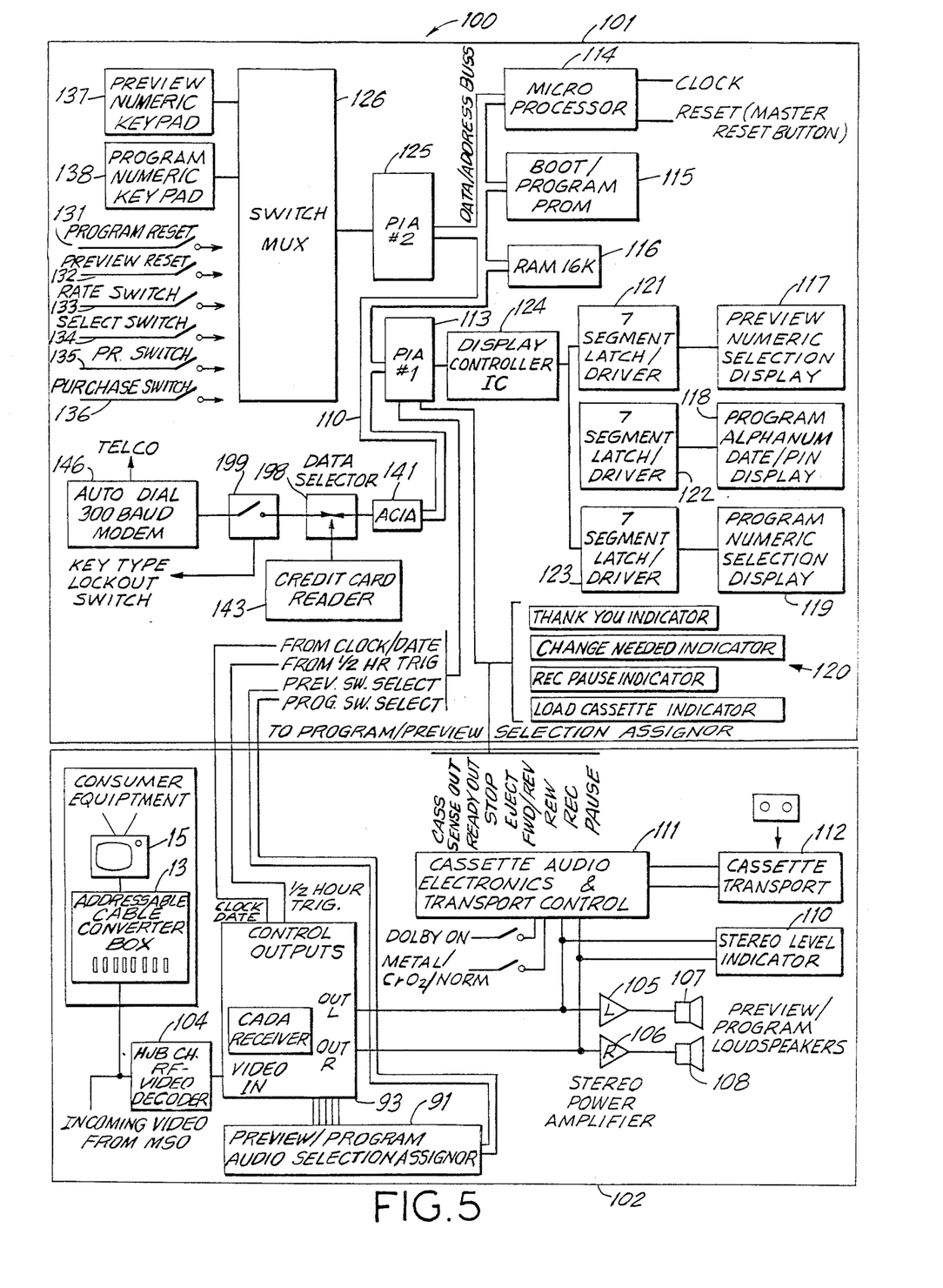
FIG. 5 is a block diagram of a receiver used by subscribers to receive the prerecorded entertainment.

Referring now to FIG. 5, a block diagram illustrates the receiver 100 of the present invention. The receiver 100 includes two main sections, i.e., a program and logic control section 101 and a audio/video routing section 102. The cable controller 13 is coupled between the coaxial cable network and the subscriber's television set 15.

The input from the cable network is applied to an addressable cable converter box 103 and a rf video decoder 104 which separate the selected signals from the plurality of input signals. The video portion of the selected signals is applied to the subscriber's television 15. A trap may be necessary to insure that only the desired video signal is applied to the television 15. The selected complete work or preview signals are applied to power amplifiers 105, 106 which drive stereo speakers 107, 108. The speakers enable the subscriber to hear the selected audio signals. The selected audio signals are also applied to a level indicator 110 which allows the subscriber to monitor the quality of the audio signals to be recorded. The audio signals are recorded on a cassette recording unit which includes cassette electronics 111 and cassette transport 112. The cassette electronics 111 are controlled by the program and logic control section 101.

The program and logic control section 101 receives input signals from the CADA unit in the form of a clock/data signal and a trigger signal. The program and logic control section 101 is also responsive to input signals from the program/preview selection assignor 91 which are applied to a PIA (Peripheral Interface Adaptor) 113. The PIA 113 is connected to a bus 110 that couples the input signals to a microprocessor 114.

The microprocessor 114 controls the program and logic control section 101. The microprocessor 114 is connected to a programmable read only memory 115, which contains a program, and to random access memory 116 which stores data. The microprocessor 114 controls displays 117, 118, 119, 120 in order to provide visual indications of various activities associated with the operation of the receiver 100. The displays are driven and controlled by controller 124 and by drivers 121, 122, 123.

The system control program required to control the operation of the system will be readily apparent to the skilled artisan based on the following description. Therefore, the following will not provide an unnecessarily lengthy description of the operation of such a program as is contained in ROM 115.

When data is input on preview keypad 137, the selected work is output via through the power amplifiers 105, 106 to the stereo speakers 107, 108. The preview function may be reset by pressing the reset switches 132.

When data is input on the program keypad, the program determines which of the date, selection, or PIN keys has been depressed and thereafter accepts the appropriate input data. When a credit car is in slot 169 and the purchase bar is pressed, the program checks the lockout, dials the billing service, and transfers the data previously input by the operator via the modem. During this period the PIN key is flashed.

On receipt of a positive response from the billing service, the "Thank You" light 111a is activated along with Record and Pause indicators 116 and 111c. If a negative response is received from the billing service, the "Change Needed" light 111d is activated and the user will be unable to record his selection.

When the date from clock 53 corresponds to the date previously input by the operator, at the hour digital signal the recording of the first side of the cassette begins. At the ½ hour digital signal, the cassette is reversed and the second side recorded.

Input data to the microprocessor 114 is applied through a PIA 125 and a switching multiplexer 126. The subscriber inputs data by activating one of switches 131-136 or the keypads 137-138.

The microprocessor 114 also controls the output of data for billing purposes. An acia (asynchronous communication interface adapter) 141 is connected to the bus 110 and transfers data to an autodial modem 140 via a key type lockout switch 199 and a data selector 198. A credit card reader 142 or other suitable device is used to input financial data regarding the subscriber. This information is transmitted by the modem 140 over telephone lines to the national credit network 16.

Figure 6:
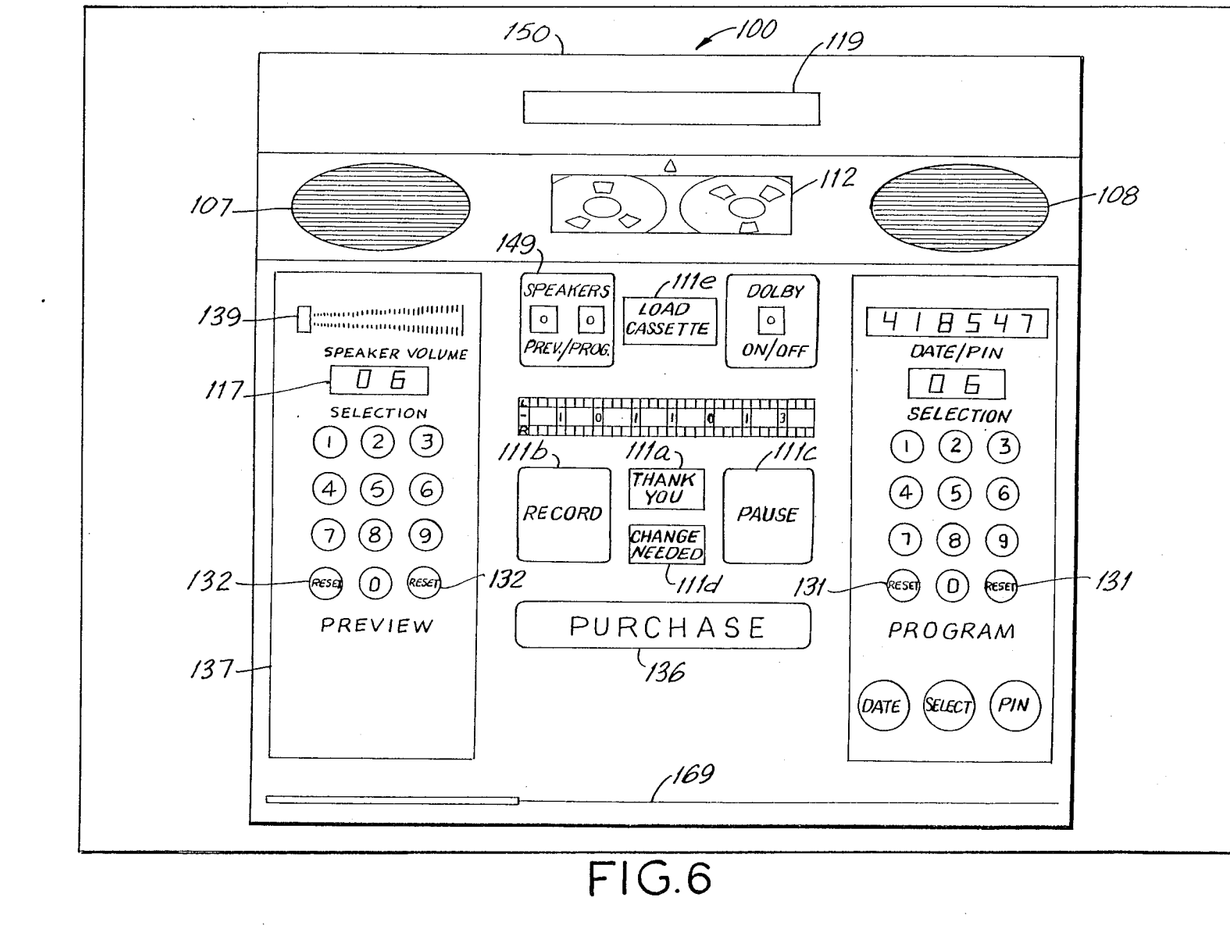
FIG. 6 is a plan view of the receiver for subscribers.

Referring now to FIG. 6, a plan view illustrates the console 150 for the receiver 100. The console 150 includes keypads 137, 138 for entering preview and program data. The program reset switches 131 are part of keypad 128, and the preview reset switches 132 are part of keypad 137. The speakers 107, 108 and cassette transport 112 are disposed within the console 150. The console 150 also includes controls and indicator lights 111 for the cassette, the purchase switch 136, the pin switch 135, the select switch 134, and the date switch 132. Displays 117, 118, and 119 are disposed on the console 150 for easy viewing.

Figure 7:
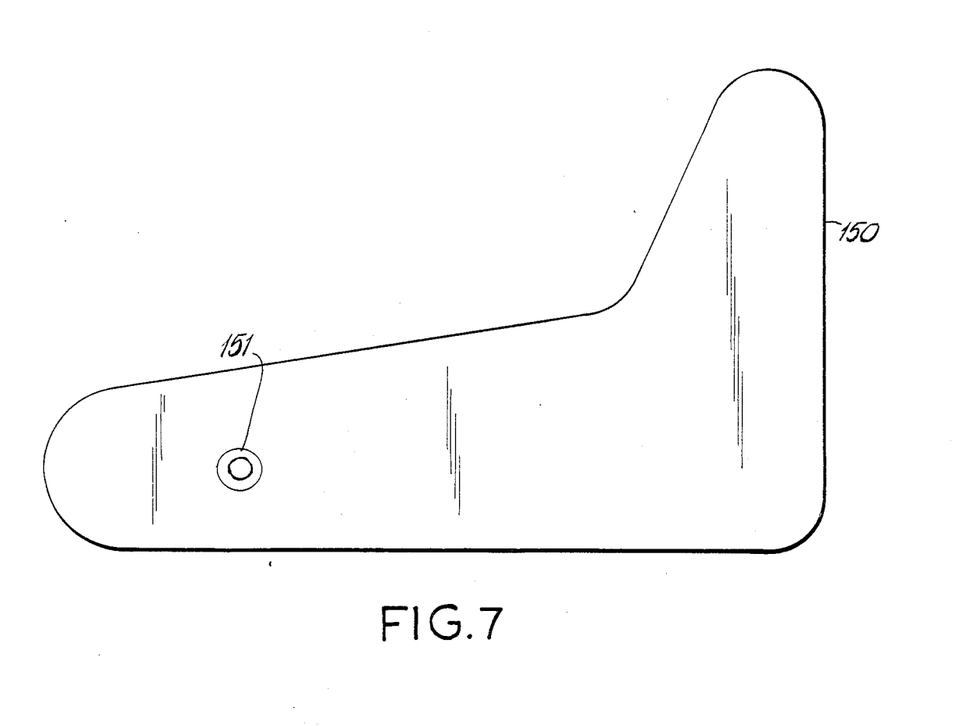
FIG. 7 is a side view of the receiver of FIG. 6.
Figure 8:
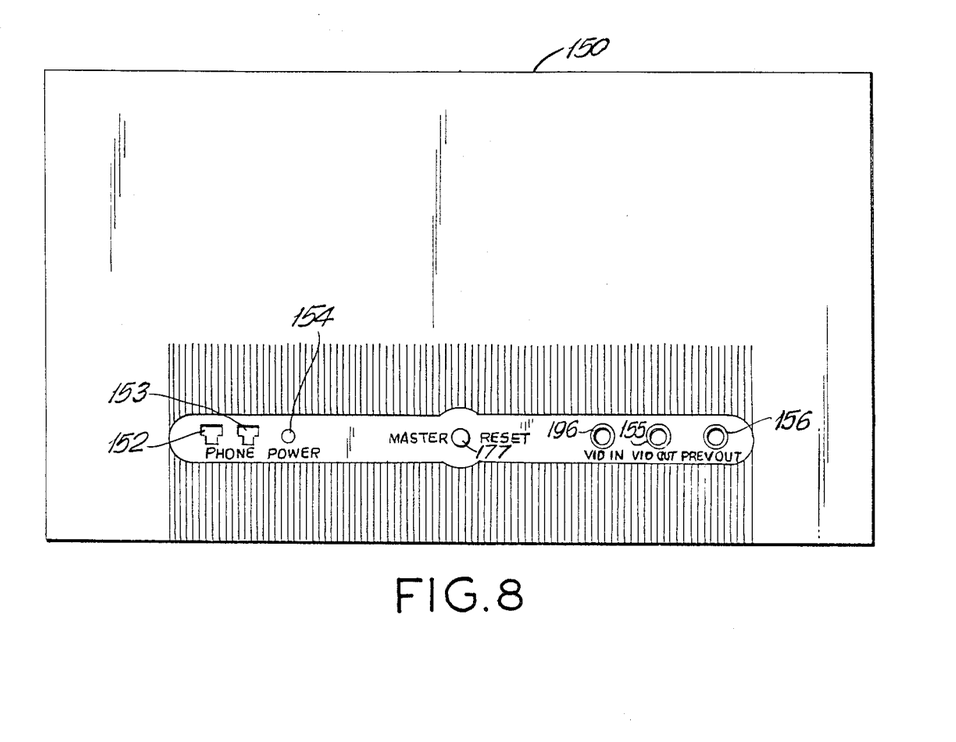
FIG. 8 is a rear view of the receiver illustrated in FIG. 6.

Referring now to FIGS. 7 and 8, side and rear views of the console are provided. On the side of console 150 there is a lock 151 which prevents the unauthorized use of the modem. On the rear of the console 150, there are two standard telephone connectors 152, 153, a power cord 154, a master reset button 197, video in connector 196, optional video output connector 155 (for video trap) and preview output connector 156.

In the operation of the present invention, a minimum of 4 stereo pairs (8 mono) of digital audio are simultaneously transmitted via coaxial cable on a designated channel and are independently selected and recorded on an audio cassette or CD at the subscriber's receiver 100. The digital signal is integrated with the video signal so that when the pay per view channel is selected, a selection menu and/or advertising will appear on the screen of television 15. The complete musical work is supplied from record companies in the form of digital tape, CD disc or analog masters. All forms are transferred to ¾" digital cassette or CD for transmission. A digital signal is transmitted every hour on the hour to give the "Forward Roll Command" and every ½ hour on the ½ hour to give the "Reverse Roll Command" or "continue" command for the audio cassette or CD at the subscribers receivers 100. Side "A" selections are transmitted 10 seconds after the hour and Side "B" 10 seconds after the ½ hour to give the cassette or CD associated with receiver 100 enough time for leader clearance or first groove cut. Analog cart machines continuously play a three minute preview or loop of highlighted material from each album selection. The consumer is, therefore, able to preview a selection before purchase. The record companies will supply the three minutes of edited material to be used for each cart. The preview transmission for each cart is transmitted digitally on the same video signal as the main digital transmission.

The controller 13 receives a split feed of the main coaxial cable feeding the subscriber's main channel selector or cable ready television. The controller 13 and receiver 100 are internally set by rf-video decoder 104 to the appropriate channel transmitting the digital audio signal. All vulnerable electronics of the receiver 100 are sealed to prevent disclosure or unauthorized tampering.

The subscriber operates the invention by turning the television 15 on and switching the main cable selector to the pay per view channel. A menu of record selections appears on the television screen. The subscriber turns the speaker switch 149 to "Preview" making sure the speaker volume 139 is on. He previews the selections on the television menu by pressing the appropriate number for each selection on the preview keypa-d 137.- The selection number appears in a window 117 above the keypad. Once a selection has been chosen, the speaker switch 149 is switched to "Program" and a 60 minute minimum audio cassette or CD is inserted into the slot 119 marked with the arrow pointing downward. The cassette automatically rewinds to the head of the leader. Once the cassette has rewound, the appropriate EQ is automatically selected for the type of cassette being used, e.g., Norm, Cr02, Metal. The subscriber presses the date key and enters the month and day using the program keypad 138. The date appears in the window 118. The subscriber then presses the select key 124 and enters the selection number he wishes to record using the program keypad 138. The selection number appears in the window 119. At this point, the subscriber can double check to make sure that the correct date and selection number appear in the windows 118, 119. Once the purchase key 136 is pressed, the date and selection number cannot be changed, unless the master react button is pressed, and the subscriber is then billed for that selection. By referring to the television menu or guide, the subscriber can double check his selection.

The subscriber presses the PIN (personal identification number) key and enters his PIN using the program keypad 138. The PIN number appears in the window 118 for 15 seconds. The subscriber then puts his credit card into the slot 169 at the bottom of the receiver 100. The subscriber then presses the purchase key 136. The subscriber waits approximately 10–15 seconds. During this period a red light within the PIN key 135 will flash indicating that the subscriber cannot use his telephone without interrupting the purchase. If appropriate funds are available in the subscriber's checking account, the amount of the selection will be withdrawn and the "Thank You" 111a light will activate simultaneously with the Record and Pause indicators 111b, 111c. The subscriber at this point will not be able to make another selection or withdraw his cassette or CD from the receiver 100 until after the recording has been completed. The subscriber will also not be able to preview during recording. If sufficient funds are not available, the "Change Needed" light 111d will be activated, and the subscriber will be unable to record a selection until appropriate funds are deposited into his account. Each subscriber receives his own PIN. Each subscriber is obliged to have a credit or checking account and must be willing to disclose its number for electronic access. The purchased selection appears in the customer's monthly credit or checking account statement.

Funds deposited into the central receiving account will also carry the following information for monthly customer receipts and record company profits: price per transaction, type of transaction (i.e., savings account, checking account, credit card), account or card number, terminal identification number, date of transaction, time of transaction, transaction referral number and approval number of the bank or credit card company. Each record will receive the date and selection number as a code number for accounting and processing. If a record is rebroadcast at a later date, it should not be listed under the same selection number as previously offered to avoid accounting and code number confusion. Monies due via subscriber selections will be sent to the appropriate record companies and publishers. At the first of each month the subscriber will receive their service and/or receiver leasing bill for the up-coming month and last month's purchase statement with the subscriber account number, date, selection number and title, price per selection and total monthly billing to cross reference with their checking account statement.

While the invention has been described in its preferred embodiments, it is to be understood that the words which have been used are words of description, rather than limitation, and that changes may be made within the purview of the appended claims without departing from the true scope and spirit of the invention in its broader aspects.

I claim:

1. A system for distributing prerecorded audio entertainment or computer software to subscribers which comprises:
   (a) a source of prerecorded entertainment that includes both complete works of entertainment and previews of the entertainment;
   (b) a transmitter for converting the prerecorded audio entertainment or computer software and previews into an electronic format suitable for transmission;
   (c) a network for transmitting the electronically formatted prerecorded entertainment, computer software and previews, which comprise digital audio, analog audio and computer data to subscribers through a system which transmits within a single transmission channel a plurality of auido subchannels, data subchannels, or a combination thereof, selected ones of said plurality of subchannels transmitting previews on a substantially continuous basis and selected other ones of said plurality of subchannels transmitting complete works of audio entertainment or computer software on a periodic basis;
   (d) a plurality of receivers disposed at the location of each subscriber and connected to said transmitting network for receiving the complete works of audio entertainment or computer software and previews, said receivers including:
      1. means for the subscriber to monitor the previews transmitted to said receiver;
      2. means for selecting a subchannel which is transmitting a complete work of entertainment or computer software;
      3. means for recording the electronically formatted prerecorded audio entertainment or computer software selected by the subscriber; and
      4. payment means coupled to said receiver which is operative to communicate payment data to a financial system which is separated from said source and in an interactive relationship with said receiver, said payment means being responsive to said financial system such that when a subscriber gives data to said payment means, the payment means communicates said data to the financial system which verifies said data and transmits a positive response to the recording means to allow it to record the selected subchannel transmission such that the subscriber obtains a first generation physical copy of the transmission per recording means associated with each receiver, said recording means also having means for preventing said subscriber from obtaining more than one first generation physical copy of the transmission per positive response.

2. A system according to claim 1 wherein said network includes a plurality of coaxial cables.

3. A system according to claim 1 wherein said network includes a plurality of FM transmitting means and FM . receiving means.

4. A system according to claim 1 wherein said means for converting the prerecorded entertainment into an electronic format includes a plurality of cart machines and a plurality of compact disc machines coupled to a CADA transceiver.

5. A system according to claim 1 wherein the receiving means at the subscriber's location includes a CADA receiver.

6. A system according to claim 5 wherein the recording means includes an audio cassette recorder.

7. A system according to claim 5 wherein the recording means includes an audio compact disc recorder.

8. A system according to claim 6 wherein the means for entering data includes a plurality of keys.

9. A system according to claim 7 wherein the means for entering data includes a plurality of keys.

10. A system according to claim 8 whrein the payment means includes a modem for connecting the receiving means to an electronic banking system.

11. A system according to claim 9 wherein the payment means includes a modem for connecting the receiving means to an electronic banking system.

12. In a system for distributing prerecorded audio entertainment or computer software to subscribers which comprises:
   (a) a source of prerecorded entertainment that includes both complete works of entertainment and previews of the entertainment;
   (b) transmitter means for converting the prerecorded audio entertainment or computer software and previews into an electronic format suitable for transmission;
   (c) a network for transmitting the electronically formatted prerecorded entertainment, computer software and previews, which comprise digital audio, analog audio and computer data to subscribers through a system which transmits within a single transmission channel a plurality of audio subchannels, data subchannels, or a combination thereof, selected ones of said plurality of subchannels transmitting previews on a substantially continuous basis and selected other ones of said plurality of subchannels transmitting complete works of audio entertainment or computer software on a periodic basis; a receiver comprising:
      (1) means for selecting a subchannel which is transmitting a preview of the prerecorded entertainment or computer software distrubuted on the system;
      (2) means for selecting a subchannel which is transmitting a complete work of entertainment or computer software;
      (3) means for recording the electronically formatted prerecorded entertainment or computer software selected by the subscriber; and
      (4) payment means associated with the receiver which is operative to communicate payment data to a financial system which is in an interactive relationship with said receiver, said payment means being responsive to said financial system such that when a subscriber gives data to said payment means, the payment means communicates said data to the financial system which verifies said data and transmits a positive response to the recording means to allow it to record the selected subchannel transmission such that the subscriber obtains a first generation physical copy of the transmission per recording means associated with each receiver, said recording means also having means for preventing said subscriber from obtaining mroe than one first generation physical copy of the transmission per positive response.

13. A receiver according to claim 12 wherein said recording means includes an audio cassette recorder.

14. A receiver according to claim 12 wherein said recording means includes an audio compact disc recorder.

15. A receiver according to claim 13 wherein said means for entering data includes a plurality of keys.

16. A receiver according to claim 14 wherein said means for entering data includes a plurality of keys.

17. A receiver according to claim 15 wherein said payment means includes a modem.

18. A receiver according to claim 16 wherein said payment means includes a modem.

* * * * *